(12) United States Patent
Zhuo et al.

(10) Patent No.: US 11,287,156 B2
(45) Date of Patent: Mar. 29, 2022

(54) METHOD FOR CONTROLLING AIR CONDITIONER COMPRESSOR FREQUENCY BASED ON VIBRATION OF PIPELINE

(71) Applicants: Qingdao Haier Air-conditioning Electronic Co., Ltd, Shandong (CN); Haier Smart Home Co., Ltd., Shandong (CN)

(72) Inventors: Baitian Zhuo, Qingdao (CN); Bin Shi, Qingdao (CN); Xiuge Li, Qingdao (CN); Shaojiang Cheng, Qingdao (CN); Ruigang Zhang, Qingdao (CN); Jun Wang, Qingdao (CN)

(73) Assignees: Qingdao Haier Air-conditioning Electronic Co., Ltd, Qingdao (CN); Haier Smart Home Co., Ltd., Qingdao (CN)

( * ) Notice: Subject to any disclaimer, the term of this patent is extended or adjusted under 35 U.S.C. 154(b) by 22 days.

(21) Appl. No.: 16/962,630

(22) PCT Filed: Aug. 12, 2019

(86) PCT No.: PCT/CN2019/100152
§ 371 (c)(1),
(2) Date: Jul. 16, 2020

(87) PCT Pub. No.: WO2020/181715
PCT Pub. Date: Sep. 17, 2020

(65) Prior Publication Data
US 2021/0215371 A1    Jul. 15, 2021

(30) Foreign Application Priority Data

Mar. 11, 2019 (CN) .......................... 201910181740.2

(51) Int. Cl.
F24F 11/64 (2018.01)
F24F 11/32 (2018.01)
(Continued)

(52) U.S. Cl.
CPC .............. *F24F 11/64* (2018.01); *F24F 11/32* (2018.01); *F24F 11/86* (2018.01); *G05B 15/02* (2013.01); *F24F 2140/00* (2018.01)

(58) Field of Classification Search
None
See application file for complete search history.

(56) References Cited

U.S. PATENT DOCUMENTS

| 4,399,548 A * | 8/1983 | Castleberry ............. F04C 28/28 340/683 |
| 2005/0204818 A1* | 9/2005 | Singhal .............. G01N 29/4472 73/579 |

(Continued)

*Primary Examiner* — Bernard G Lindsay
(74) *Attorney, Agent, or Firm* — Maier & Maier, PLLC

(57) ABSTRACT

To solve the problem that a resonance phenomenon occurs between an outdoor unit and a compressor of existing air conditioners, embodiments include a compressor and a pipeline connected to the compressor. A control method includes obtaining a vibration displacement of the pipeline during the operation of the air conditioner and recording it as a first vibration displacement; obtaining the vibration displacement of the pipeline again after time has elapsed and recording it as a second vibration displacement; and selectively adjusting operating parameters of the compressor according to the first vibration displacement and the second vibration displacement. The vibration condition of the outdoor unit is determined through the real-time vibration condition and the vibration change condition of the pipeline so the air conditioner can selectively change the operating parameters of the compressor according to the vibration condition. Thus the vibration condition of the compressor is changed to avoid pipeline damage.

7 Claims, 2 Drawing Sheets

(51) Int. Cl.
*F24F 11/86* (2018.01)
*G05B 15/02* (2006.01)
*F24F 140/00* (2018.01)

(56) References Cited

U.S. PATENT DOCUMENTS

| | | | |
|---|---|---|---|
| 2015/0039139 A1* | 2/2015 | Meeuwsen | G05D 19/02 700/280 |
| 2016/0003491 A1* | 1/2016 | D'Orlando | G01H 1/003 702/184 |
| 2016/0282026 A1* | 9/2016 | Park | F24F 1/22 |
| 2017/0030349 A1* | 2/2017 | Bassett | F04B 53/10 |

* cited by examiner

METHOD FOR CONTROLLING AIR CONDITIONER COMPRESSOR FREQUENCY BASED ON VIBRATION OF PIPELINE

FIELD

The present disclosure belongs to the technical field of air conditioners, and particularly relates to a control method for an air conditioner.

BACKGROUND

With the continuing improvement of people's living standards, people have raised higher and higher requirements on their living environments. In order to maintain a comfortable ambient temperature, an air conditioner has become an essential device in people's lives. In recent years, although the technology of air conditioner has developed to a very mature level, there is still room for improvement in existing air conditioners. For example, a compressor is disposed in outdoor units of the existing air conditioners, and the compressor will constantly produce vibration during the operation, which will inevitably cause the outdoor unit to vibrate therewith; especially for air conditioners equipped with a variable frequency compressor, the vibration frequency of the variable frequency compressor will change with the change of its own operating frequency. During the change of the operating frequency, there must be some operating frequencies that will cause a resonance between the compressor and the outdoor unit, which will make it easy for the outdoor unit to produce noise, and even cause damage to elements inside the outdoor unit.

In order to effectively avoid the resonance phenomenon between the compressor and the outdoor unit, in the related art, the technician usually measures these operating frequency points that cause the resonance phenomenon between the compressor and the outdoor unit before the air conditioner leaves the factory; then, in a process of controlling the variable frequency compressor to generate frequency changes, these operating frequency points are removed to avoid the resonance phenomenon between the compressor and the outdoor unit; however, it has been found through practice that due to manufacturing errors in the production of parts and different installation conditions of various outdoor units, the resonance operating frequency points measured by the technician before the air conditioner leaves the factory are often different from the operating frequency points at which the resonance phenomenon actual occurs, which will cause the existing outdoor units to easily resonate with the compressors to generate noise, and even cause damage to some parts of the outdoor units.

Accordingly, there is a need in the art for a new control method for an air conditioner to solve the above problems.

SUMMARY

In order to solve the above-mentioned problems in the related art, that is, to solve the problem that a resonance phenomenon easily occurs between an outdoor unit and a compressor of existing air conditioners, the present disclosure provides a control method for an air conditioner, wherein the air conditioner includes a compressor and a pipeline connected to the compressor, and the control method includes the following steps: obtaining a vibration displacement of the pipeline during the operation of the air conditioner and recording it as a first vibration displacement; obtaining the vibration displacement of the pipeline again after a preset time has elapsed and recording it as a second vibration displacement; and selectively adjusting operating parameters of the compressor according to the first vibration displacement and the second vibration displacement.

In a preferred technical solution of the above control method for the air conditioner, the step of "selectively adjusting the operating parameters of the compressor according to the first vibration displacement and the second vibration displacement" specifically includes: calculating a difference between the second vibration displacement and a preset displacement, and a difference between the second vibration displacement and the first vibration displacement; and selectively adjusting the operating parameters of the compressor according to the difference between the second vibration displacement and the preset displacement, and the difference between the second vibration displacement and the first vibration displacement.

In a preferred technical solution of the above control method for the air conditioner, the step of "selectively adjusting the operating parameters of the compressor according to the difference between the second vibration displacement and the preset displacement, and the difference between the second vibration displacement and the first vibration displacement" specifically includes: calculating a result obtained by adding a product of the difference between the second vibration displacement and the preset displacement and a first coefficient, and a product of the difference between the second vibration displacement and the first vibration displacement and a second coefficient; and selectively adjusting the frequency of the compressor according to the calculation result.

In a preferred technical solution of the above control method for the air conditioner, the first coefficient is greater than the second coefficient.

In a preferred technical solution of the above control method for the air conditioner, the step of "selectively adjusting the frequency of the compressor according to the calculation result" includes: adjusting the frequency of the compressor, if the calculation result is greater than a preset value.

In a preferred technical solution of the above control method for the air conditioner, the step of "adjusting the frequency of the compressor" specifically includes: obtaining a change trend of the frequency of the compressor; controlling an adjustment direction of the frequency of the compressor according to the change trend of the frequency of the compressor; and controlling an adjustment amount of the frequency of the compressor according to the calculation result.

In a preferred technical solution of the above control method for the air conditioner, the step of "controlling the adjustment direction of the frequency of the compressor according to the change trend of the frequency of the compressor" specifically includes: increasing the frequency of the compressor, if the frequency of the compressor is in an ascending trend; and decreasing the frequency of the compressor, if the frequency of the compressor is in a descending trend.

In a preferred technical solution of the above control method for the air conditioner, the step of "obtaining the change trend of the frequency of the compressor" specifically includes: obtaining a first frequency corresponding to the first vibration displacement and a second frequency corresponding to the second vibration displacement; and determining the change trend of the frequency of the compressor according to the first frequency and the second frequency.

In a preferred technical solution of the above control method for the air conditioner, the step of "selectively adjusting the frequency of the compressor according to the calculation result" further includes: not adjusting the frequency of the compressor, if the calculation result is less than or equal to the preset value.

In a preferred technical solution of the above control method for the air conditioner, the preset value is zero.

It can be understood by those skilled in the art that in the technical solution of the present disclosure, the air conditioner of the present disclosure includes a compressor and a pipeline connected to the compressor, and the control method of the present disclosure includes the following steps: obtaining a vibration displacement of the pipeline during the operation of the air conditioner and recording it as a first vibration displacement; obtaining the vibration displacement of the pipeline again after a preset time has elapsed and recording it as a second vibration displacement; and selectively adjusting operating parameters of the compressor according to the first vibration displacement and the second vibration displacement. It can be understood that since the pipeline is a flexible member and is directly connected to the compressor, the pipeline is a member that is most likely to follow the compressor to vibrate, and at the same time the pipeline is also a member that is most likely to be damaged; in view of this, the vibration displacement of the pipeline is detected in the present disclosure and is used as a basic parameter for detecting the vibration condition, thereby effectively improving the accuracy and sensitivity of the detection. In the control method of the present disclosure, the air conditioner can determine the real-time vibration condition of the pipeline through the second vibration displacement, and at the same time, the air conditioner can also determine the vibration change condition of the pipeline through a combination of the first vibration displacement and the second vibration displacement, so that the air conditioner can determine the vibration condition of the entire outdoor unit through the real-time vibration condition and the vibration change condition of the pipeline, thus enabling the air conditioner to detect the vibration condition of the outdoor unit in real time and accurately, and effectively judging the possibility of the resonance phenomenon between the compressor and the outdoor unit; the air conditioner can selectively change the operating parameters of the compressor to change the vibration condition of the compressor according to the vibration condition of the outdoor unit, thereby effectively avoiding the problem of pipeline damage caused the resonance phenomenon between the compressor and the outdoor unit, and further effectively improving the user experience during use.

Further, in a preferred technical solution of the present disclosure, the air conditioner can selectively adjust the operating parameters of the compressor according to the difference between the second vibration displacement and the preset displacement, and the difference between the second vibration displacement and the first vibration displacement; it can be understood that the air conditioner can judge whether a vibration amplitude of the pipeline has exceeded a preset amplitude according to the difference between the second vibration displacement and the preset displacement. If the vibration amplitude of the pipeline has exceeded the preset amplitude, there is a risk of resonance phenomenon between the compressor and the outdoor unit, or even the resonance phenomenon has occurred, and the pipeline has also a risk of being damaged. Meanwhile, the air conditioner can also judge whether a change speed of the vibration amplitude of the pipeline is too fast according to the difference between the second vibration displacement and the first vibration displacement; if the change speed of the vibration amplitude of the pipeline is too fast, there is also a risk of resonance phenomenon between the compressor and the outdoor unit; the air conditioner can selectively adjust the operating parameters of the compressor according to the vibration amplitude of the pipeline and the change speed of the vibration amplitude of the pipeline, so that the operating parameters of the compressor can be changed in a timely manner when there is a risk of resonance phenomenon between the compressor and the outdoor unit, thus enabling the vibration condition of the compressor to be changed in time, and thereby effectively avoiding the resonance phenomenon between the compressor and the outdoor unit, which would otherwise damage the pipeline and produce noise.

Further, in a preferred technical solution of the present disclosure, the difference between the second vibration displacement and the preset displacement indicates a deviation amount between the vibration amplitude of the pipeline and the preset amplitude, and the first coefficient indicates the importance degree of the deviation amount between the vibration amplitude of the pipeline and the preset amplitude in this judgment; the difference between the second vibration displacement and the first vibration displacement indicates how fast the vibration amplitude of the pipeline changes, and the second coefficient indicates the importance degree of how fast the vibration amplitude of the pipeline changes in this judgment. The air conditioner judges the vibration condition of the pipeline by taking both the vibration amplitude of the pipeline and how fast the vibration amplitude changes into consideration; when the vibration condition of the pipeline is already serious, the air conditioner adjusts the frequency of the compressor, thereby effectively changing the vibration condition of the compressor. It should be noted that the more the vibration amplitude of the pipeline is greater than the preset amplitude, the greater the adjustment amount of the frequency of the compressor should be, so that the vibration condition of the compressor can change to a greater extent; meanwhile, the faster the vibration amplitude of the pipeline changes, the greater the adjustment amount of the frequency of the compressor should also be, so that the vibration condition of the compressor can change to a greater extent. Therefore, in the control method of the present disclosure, the difference between the second vibration displacement and the preset displacement and the difference between the second vibration displacement and the first vibration displacement are used as basic parameters for calculating the adjustment amount. It can be understood that when judging the vibration condition of the pipeline, the importance of the vibration amplitude is greater than the importance of the change speed of the vibration amplitude. Therefore, it is preferable that the first coefficient is greater than the second coefficient.

Further, in a preferred technical solution of the present disclosure, if the calculation result is greater than the preset value, it indicates that there is a risk of resonance phenomenon between the compressor and the outdoor unit, or even the resonance phenomenon has already occurred; in this case, the air conditioner needs to adjust the frequency of the compressor. If the calculation result is less than or equal to the preset value, it indicates that at this point, there is no risk of resonance phenomenon between the compressor and the outdoor unit; in this case, the air conditioner does not need to adjust the frequency of the compressor.

Further, in a preferred technical solution of the present disclosure, when the calculation result is greater than the preset value, the air conditioner needs to adjust the frequency of the compressor; specifically, the air conditioner needs to control its adjustment direction according to the change trend of the frequency of the compressor. Since changing the frequency of the compressor will cause a compression efficiency of the compressor to be changed, which will therefore cause a heat exchange efficiency of the entire air conditioner to be changed, the change trend of the frequency itself must be taken into consideration when adjusting the frequency of the compressor, namely, the change trend of the frequency of the compressor when the requirement of heat exchange is met has to be considered. If the frequency of the compressor is in an ascending trend, it indicates that the heat exchange efficiency of the air conditioner needs to be improved. Therefore, the air conditioner can only increase the frequency of the compressor, so as not to affect the heat exchange efficiency of the air conditioner. If the frequency of the compressor is in a descending trend, it indicates that the heat exchange efficiency of the air conditioner needs to be reduced. Therefore, the air conditioner can only decrease the frequency of the compressor to avoid unnecessary energy waste. At the same time, the adjustment amount of the frequency of the compressor by the air conditioner is the above calculation result, so that the air conditioner can adjust the frequency of the compressor by different amplitudes according to different vibration conditions. Since the compressor and the outdoor unit may also easily generate large-amplitude vibrations when the frequency of the compressor is a frequency point near the resonance frequency point, the air conditioner determines the adjustment amount of the frequency of the compressor through the above calculation result in the present control method so that the compressor can skip some frequency points near the resonance frequency points, thereby effectively weakening the vibrations of the compressor and the outdoor unit.

DETAILED DESCRIPTION

Figure 1:
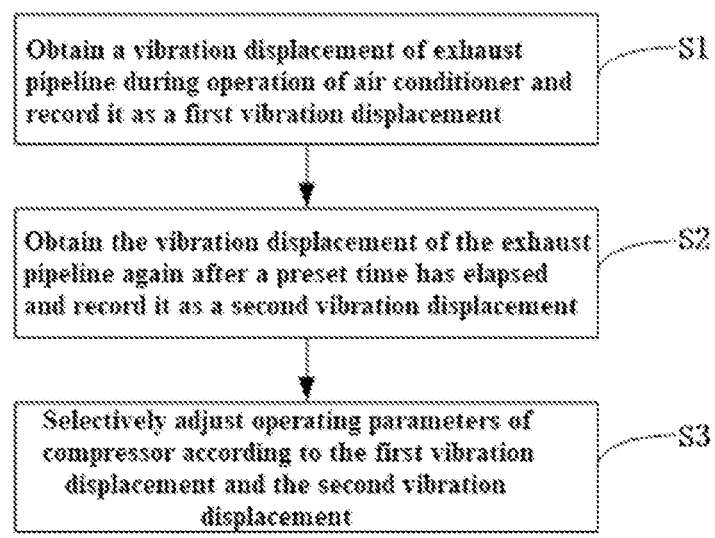
FIG. 1 is a flowchart showing main steps of a control method according to the present disclosure.

Hereinafter, preferred embodiments of the present disclosure will be described with reference to the accompanying drawings. It should be understood by those skilled in the art that these embodiments are only used to explain the technical principles of the present disclosure, and are not intended to limit the scope of protection of the present disclosure. For example, although various steps of the method according the present disclosure are described in specific orders in the present application, these orders are not restrictive, and those skilled in the art may execute the steps in different orders without departing from the basic principles of the present disclosure.

As mentioned in background section, in the related art, the technician usually measures these operating frequency points that cause the resonance phenomenon between the compressor and the outdoor unit before the air conditioner leaves the factory; then, in a process of controlling the variable frequency compressor to generate frequency changes, these operating frequency points are removed to avoid the resonance phenomenon between the compressor and the outdoor unit; however, due to external factors, the resonance operating frequency points measured by the technician before the air conditioner leaves the factory are often different from the operating frequency points at which the resonance phenomenon actual occurs, which will cause the existing outdoor units to easily resonate with the compressors to generate noise, and even cause damage to some parts of the outdoor units. In order to solve the above problems in the related art, the present disclosure provides a control method for an air conditioner. In the control method, operating parameters of the compressor are selectively adjusted according to a vibration condition of the pipeline, thereby effectively preventing resonance from being generated between the compressor and the outdoor unit, which would otherwise produce noise and even cause damage to the pipeline.

Specifically, the air conditioner includes an outdoor unit and a compressor disposed in the outdoor unit, wherein an intake port of the compressor is connected to an intake pipeline, and an exhaust port of the compressor is connected to an exhaust pipeline. Since the diameter of the intake pipeline is usually greater than the diameter of the exhaust pipeline, the vibration amplitude of the exhaust pipeline is usually greater than the vibration amplitude of the intake pipeline. In view of this, a displacement sensor is disposed in the exhaust pipeline in the present preferred embodiment so that the displacement sensor can detect a vibration displacement of the exhaust pipeline. It can be understood by those skilled in the art that the present disclosure does not impose any limitations on the specific structure of the air conditioner, as long as the air conditioner can execute the control method of the present disclosure; meanwhile, the present disclosure also does not impose any limitations on the specific setting position and number of the displacement sensor, that is, the displacement sensor may also be disposed in the intake pipeline, or in both the intake pipeline and the exhaust pipeline, as long as the displacement sensor can detect the vibration displacement of the pipeline connected to the compressor.

Further, the air conditioner further includes a controller capable of obtaining a detection result of the displacement sensor and operating parameters of the air conditioner, and the controller is also capable of controlling the operating parameters of the air conditioner. It should be noted that the present disclosure does not impose any limitations on the specific structure and model of the controller, as long as the controller can implement the above functions; moreover, the controller may be an original controller of the air conditioner, or may also be a controller provided separately for executing the control method of the present disclosure, and the technician may set the structure and model of the controller by himself/herself according to actual requirements on use.

First, reference is made to FIG. 1, which is a flowchart showing main steps of the control method according to the present disclosure. As shown in FIG. 1, based on the air conditioner described in the above embodiment, the control method of the present disclosure mainly includes the following steps:

S1: obtaining a vibration displacement of the exhaust pipeline during the operation of the air conditioner and recording it as a first vibration displacement;
S2: obtaining the vibration displacement of the exhaust pipeline again after a preset time has elapsed and recording it as a second vibration displacement; and S3: selectively adjusting operating parameters of the compressor according to the first vibration displacement and the second vibration displacement.

Further, in step S1, during the operation of the air conditioner, the controller can obtain the vibration displacement of the exhaust pipeline through the displacement sensor and record it as the first vibration displacement; it is noted that the first vibration displacement may either be a vibration displacement of a certain point on the exhaust pipeline, or an average value of the vibration displacements of a plurality of points on the exhaust pipeline. Next, in step S2, after the first vibration displacement is detected and the preset time has elapsed, the controller obtains the vibration displacement of the exhaust pipeline through the displacement sensor again and record it as the second vibration displacement. It can be understood that the technician may set the length of the preset time by himself/herself according to actual use conditions, and the second vibration displacement may either be a vibration displacement of a certain point on the exhaust pipeline, or an average value of the vibration displacements of a plurality of points on the exhaust pipeline. It can be understood by those skilled in the art that although the controller described in the present preferred embodiment obtains the vibration displacement of the exhaust pipeline through the displacement sensor provided for the air conditioner itself, it is obvious that the controller can also obtain the vibration displacement of the exhaust pipeline through an external sensor. The present disclosure does not impose any limitations on the manner in which the controller obtains the vibration displacement, as long as the controller can obtain the vibration displacement of the exhaust pipeline.

Further, in step S3, the controller can selectively adjust the operating parameters of the compressor according to the first vibration displacement and the second vibration displacement. It can be understood that as set by the technician, a judgment condition may be judging whether the second vibration displacement is greater than the first vibration displacement, or may be judging whether the ratio of the second vibration displacement to the first vibration displacement is greater than a preset ratio, or even may be judging whether a relational expression is satisfied after the first vibration displacement and the second vibration displacement are brought into the relational expression; that is, a change of the specific judgment condition does not depart from the basic principle of the present disclosure; as long as the first vibration displacement and the second vibration displacement are used as basic parameters in the judgment condition, any change will fall within the scope of protection of the present disclosure. In addition, those skilled in the art can also understand that the operating parameters of the compressor described in the present disclosure may be operating parameters such as frequency, intake pressure, exhaust pressure, etc. The technician may choose the operating parameters adjusted in the present control method by himself/herself according to the actual requirements on use, as long as the vibration condition of the compressor can be changed after the controller adjusts the operating parameters.

Figure 2:
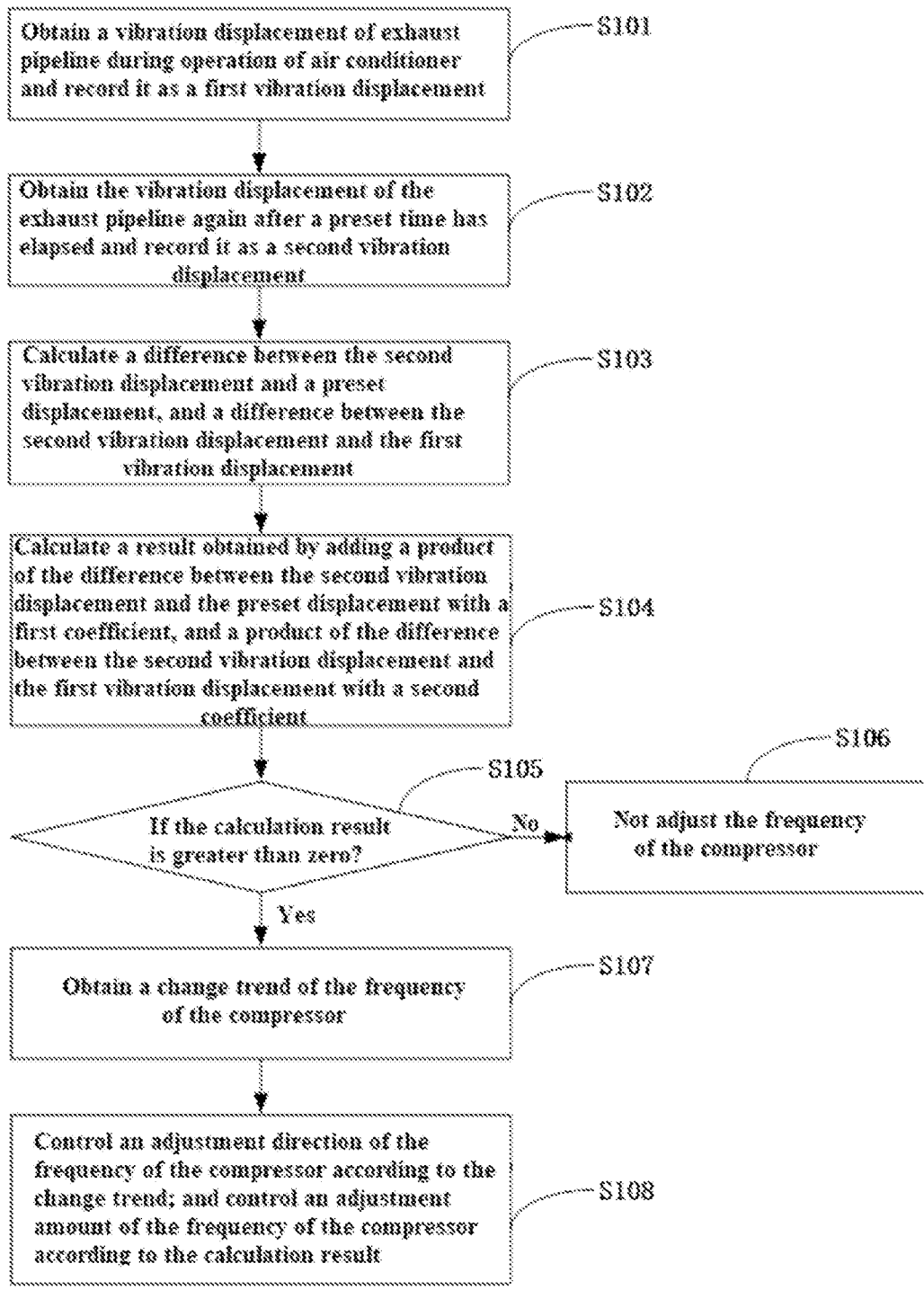
FIG. 2 is a flowchart showing steps of a preferred embodiment of a control method according to the present disclosure.

Reference is made to FIG. 2 below, which is a flowchart showing steps of a preferred embodiment of a control method according to the present disclosure. As shown in FIG. 2, based on the air conditioner described in the above embodiment, the preferred embodiment of the control method of the present disclosure mainly includes the following steps:

S101: obtaining a vibration displacement of the exhaust pipeline during the operation of the air conditioner and recording it as a first vibration displacement;

S102: obtaining the vibration displacement of the exhaust pipeline again after a preset time has elapsed and recording it as a second vibration displacement;

S103: calculating a difference between the second vibration displacement and a preset displacement, and a difference between the second vibration displacement and the first vibration displacement;

S104: calculating a result obtained by adding a product of the difference between the second vibration displacement and the preset displacement and a first coefficient, and a product of the difference between the second vibration displacement and the first vibration displacement and a second coefficient;

S105: judging whether the calculation result is greater than zero; if yes, executing step S107; and if not, executing step S106;

S106: not adjusting the frequency of the compressor;

S107: obtaining a change trend of the frequency of the compressor; and

S108: controlling an adjustment direction of the frequency of the compressor according to the change trend of the frequency of the compressor; and controlling an adjustment amount of the frequency of the compressor according to the calculation result.

Further, in step S101, during the operation of the air conditioner, the controller can obtain the vibration displacement of the exhaust pipeline through the displacement sensor and record it as the first vibration displacement; it is noted that the first vibration displacement may either be a vibration displacement of a certain point on the exhaust pipeline, or an average value of the vibration displacements of a plurality of points on the exhaust pipeline.

Further, in step S102, after the first vibration displacement is detected and the preset time has elapsed, the controller obtains the vibration displacement of the exhaust pipeline through the displacement sensor again and record it as the second vibration displacement. It can be understood that the technician can set the length of the preset time by himself/herself according to actual use conditions, and the second vibration displacement may either be a vibration displacement of a certain point on the exhaust pipeline, or an average value of the vibration displacements of a plurality of points on the exhaust pipeline.

It can be understood by those skilled in the art that although the controller described in the present preferred embodiment obtains the vibration displacement of the exhaust pipeline through the displacement sensor provided for the air conditioner itself, it is obvious that the controller can also obtain the vibration displacement of the exhaust pipeline through an external sensor. The present disclosure does not impose any limitations on the manner in which the controller obtains the vibration displacement, as long as the controller can obtain the vibration displacement of the exhaust pipeline.

Further, in step S103, the controller can calculate the difference between the second vibration displacement and the preset displacement, and the difference between the second vibration displacement and the first vibration displacement. It should be noted that in the preferred embodiment, the difference between the second vibration displacement and the preset displacement and the difference between the second vibration displacement and the first vibration displacement are only used as intermediate calculation variables. However, it is obvious that the controller may also selectively adjust the operating parameters of the compressor directly through the difference between the second vibration displacement and the preset displacement and the difference between the second vibration displacement and the first vibration displacement. For example, when the difference between the second vibration displacement and the preset displacement is greater than a first preset difference or the difference between the second vibration displacement and the first vibration displacement is greater than a second preset difference, the operating parameters of the compressor are adjusted; of course, the technician may set specific values of the first preset difference and the second preset difference by himself/herself according to actual requirements on use. In addition, those skilled in the art can understand that the technician may set the value of the preset displacement by himself/herself according to different conditions of the air conditioner, as long as it can be judged that there is already a risk of resonance phenomenon between the compressor and the outdoor unit or the resonance phenomenon has already occurred when the vibration displacement of the compressor is greater than the preset displacement.

Further, in step S104, the controller can calculate a result obtained by adding a product of the difference between the second vibration displacement and the preset displacement and the first coefficient, and a product of the difference between the second vibration displacement and the first vibration displacement and the second coefficient. Those skilled in the art can understand that when the control method of the present disclosure is applied to different air conditioners, the first coefficient and the second coefficient are usually different. When the difference between the second vibration displacement and the preset displacement and the difference between the second vibration displacement and the first vibration displacement are used as dependent variables, the technician also needs to set specific values of the first coefficient and the second coefficient by himself/herself through experiment or modeling; preferably, the first coefficient is greater than the second coefficient.

Further, in step S105, the controller can judge whether the above calculation result is greater than zero; it should be noted that although the preset value used in the present preferred embodiment is zero, it is obvious that the technician may also set the magnitude of the preset value according to the actual situation. For example, when the preset value is set to 1, the judgment condition becomes judging whether the above calculation result is greater than 1. Such a change of the specific value does not depart from the basic principle of the present disclosure. In the present preferred embodiment, if the above calculation result is greater than zero, it indicates that the compressor and the outdoor unit have a risk of resonance. At this point, step S107 is executed. If the above calculation result is less than or equal to zero, it indicates that the vibrations of the compressor and the outdoor unit are small. At this point, step S106 is executed, that is, the controller does not need to adjust the frequency of the compressor. It should be noted that said not adjusting the frequency of the compressor described in step S106 means not adjusting the frequency of the compressor leapingly, namely, not adjusting the frequency of the compressor according to the adjustment manner of the present disclosure. That is, the control method of the present disclosure does not affect other control logics of the compressor.

Further, in a case where the above calculation result is greater than zero, the controller executes step S107, namely, obtaining a change trend of the frequency of the compressor. In this step, the controller can judge the change trend of the frequency of the compressor by obtaining the frequencies corresponding to two adjacent time points. In a preferred embodiment, if the time point at which the first vibration displacement is obtained is recorded as a first time point, and the time point at which the second vibration displacement is obtained is recorded as a second time point, then the controller can obtain the operating frequency of the compressor at the first time point and record it as a first frequency, and obtain the operating frequency of the compressor at the second time point and record it as a second frequency; by comparing the magnitude of the first frequency with the magnitude of the second frequency, the controller can obtain the change trend of the frequency of the compressor. Specifically, if the second frequency is greater than the first frequency, then the frequency of the compressor is in an ascending trend; and if the second frequency is less than the first frequency, then the frequency of the compressor is in a descending trend. It can be understood that if the second frequency is equal to the first frequency, then the vibration condition of the compressor will not change, and it is impossible for the vibration conditions of the compressor and the outdoor unit to change. In addition, it should also be noted that the present disclosure does not impose any limitations on the specific manner in which the controller obtains the change trend of the frequency, and the technician may set it by himself/herself according to actual requirements on use. For example, the controller may also judge the change trend of frequency through a frequency change curve stored inside it.

Further, in step S108, the controller can control the adjustment direction of the frequency of the compressor according to the change trend of the frequency of the compressor; and the adjustment amount of the frequency of the compressor is controlled according to the calculation result. It should be noted that the controller may either determine the adjustment direction of the frequency first, or determine the adjustment amount of the frequency first, or determine the adjustment direction and adjustment amount of the frequency at the same time. Such a change in execution order does not depart from the basic principle of the present disclosure. Specifically, if the frequency of the compressor is in an ascending trend, the frequency of the compressor is increased; and if the frequency of the compressor is in a descending trend, the frequency of the compressor is decreased. After the adjustment direction of the frequency is determined, the controller adjusts the frequency of the compressor by using the previous calculation result as the adjustment amount of the frequency; for example, if the frequency of the compressor is in a descending trend and the above calculation result is 1 Hz, then the frequency of the compressor is decreased by 1 Hz. In addition, it should also be noted that the technician may also set the adjustment amount of the frequency according to the actual situation. For example, the adjustment amount may also be a fixed value. Such a change of the specific adjustment amount does not depart from the basic principle of the present disclosure, and will fall within the scope of protection of the present disclosure.

Furthermore, in a case where the above calculation result is greater than zero, the expression of the adjustment amount fixHz of the frequency of the compressor is:

$$fixHz=(realPosNow-maxPos)*Rate1+(realPosNow-realPosLast)*Rate2$$

wherein realPosNow is the second vibration displacement with the unit being μm; maxPos is the preset displacement with the unit being μm; Rate1 is the first coefficient; real- PosLast is the first vibration displacement with the unit being μm; and Rate2 is the second coefficient.

In a preferred embodiment, the preset displacement max-Pos=3 μm, the first coefficient Rate1=2, and the second coefficient Rate2=0.8 in this embodiment. In this case, the adjustment condition of the frequency is shown in the following table:

| first vibration displacement realPosLast (μm) | second vibration displacement realPosNow (μm) | current operating frequency (Hz) | adjustment direction | adjustment amount fixHz (Hz) | operating frequency after adjustment frFinal (Hz) |
|---|---|---|---|---|---|
| 2.2 | 3.5 | 51.3 | + (increase) | 2.0 | 53.3 |
| 2.3 | 4.1 | 70.6 | − (decrease) | 3.6 | 67.0 |

Based on the content in the table above, when the preset displacement maxPos=3 μm, the first coefficient Rate1=2, and the second coefficient Rate2=0.8, if the measured first vibration displacement is 2.2 μm and the measured second vibration displacement is 3.5 μm, then the adjustment amount of the frequency can be calculated to be 2 Hz. At the same time, since the current operating frequency of the compressor is 51.3 Hz and the frequency of the compressor is in an ascending trend, the current operating frequency should be increased by 2 Hz; that is, the operating frequency of the compressor is directly adjusted to 53.3 Hz. If the measured first vibration displacement is 2.3 μm and the measured second vibration displacement is 4.1 μm, then the adjustment amount of the frequency can be calculated to be 3.6 Hz. At the same time, since the current operating frequency of the compressor is 70.6 Hz and the frequency of the compressor is in a descending trend, the current operating frequency should be decreased by 3.6 Hz; that is, the operating frequency of the compressor is directly adjusted to 67.0 Hz. It should be noted that the above content is only shown as an example, and does not impose any limitations on the scope of protection of the present disclosure.

Finally, it should be noted that the above examples are all preferred embodiments of the present disclosure, and are not intended to limit the scope of protection of the present disclosure. During actual application of the present disclosure, those skilled in the art may appropriately add or delete some of the steps or change the orders of different steps as needed. Such changes do not go beyond the basic principle of the present disclosure, and will fall within the scope of protection of the present disclosure.

Heretofore, preferred embodiments of the present disclosure have been described in connection with the drawings, but it can be easily understood by those skilled in the art that the scope of protection of the present disclosure is obviously not limited to these specific embodiments. Those skilled in the art can make equivalent changes or replacements to related technical features without departing from the principle of the present disclosure. All the technical solutions obtained after the modification or replacement will fall within the scope of protection of the present disclosure.

What is claimed is:

1. A control method for an air conditioner having a compressor and a pipeline connected to the compressor, and the control method comprising:

obtaining a vibration displacement of the pipeline during the operation of the air conditioner and recording it as a first vibration displacement;

obtaining the vibration displacement of the pipeline again after a preset time has elapsed and recording it as a second vibration displacement;

calculating a difference between the second vibration displacement and a preset displacement, and a difference between the second vibration displacement and the first vibration displacement;

calculating a result obtained by adding a product of the difference between the second vibration displacement and the preset displacement and a first coefficient, and a product of the difference between the second vibration displacement and the first vibration displacement and a second coefficient; and selectively adjusting the frequency of the compressor according to the calculation result, wherein selectively adjusting the frequency of the compressor according to the calculation result comprises:

adjusting the frequency of the compressor, when the calculation result is greater than a preset value; and wherein adjusting the frequency of the compressor comprises:

obtaining a change trend of the frequency of the compressor;

controlling an adjustment direction of the frequency of the compressor according to the change trend of the frequency of the compressor; and controlling an adjustment amount of the frequency of the compressor according to the calculation result.

2. The control method according to claim 1, wherein the first coefficient is greater than the second coefficient.

3. The control method according to claim 1, wherein controlling the adjustment direction of the frequency of the compressor according to the change trend of the frequency of the compressor comprises:

increasing the frequency of the compressor, if the frequency of the compressor is in an ascending trend; and decreasing the frequency of the compressor, if the frequency of the compressor is in a descending trend.

4. The control method according to claim 1, wherein obtaining the change trend of the frequency of the compressor comprises:

obtaining a first frequency corresponding to the first vibration displacement and a second frequency corresponding to the second vibration displacement; and determining the change trend of the frequency of the compressor according to the first frequency and the second frequency.

5. The control method according to claim 1, wherein selectively adjusting the frequency of the compressor according to the calculation result further comprises:

not adjusting the frequency of the compressor, if the calculation result is less than or equal to the preset value.

6. The control method according to claim 5, wherein the preset value is zero.

7. The control method according to claim 1, wherein the preset value is zero.

* * * * *